United States Patent
Huang et al.

(10) Patent No.: US 9,268,097 B2
(45) Date of Patent: Feb. 23, 2016

(54) HIGH POWER OPTICAL FIBER ENDS HAVING PARTIALLY-DOPED GRATINGS

(71) Applicant: TeraDiode, Inc., Wilmington, MA (US)

(72) Inventors: Robin Huang, North Billerica, MA (US); Bien Chann, Merrimack, NH (US); Parviz Tayebati, Sherborn, MA (US); Mike Cruz, Somerville, MA (US)

(73) Assignee: TeraDiode, Inc., Wilmington, MA (US)

( * ) Notice: Subject to any disclaimer, the term of this patent is extended or adjusted under 35 U.S.C. 154(b) by 0 days.

(21) Appl. No.: 14/270,327

(22) Filed: May 5, 2014

(65) Prior Publication Data
US 2015/0286007 A1     Oct. 8, 2015

Related U.S. Application Data

(60) Provisional application No. 61/819,461, filed on May 3, 2013.

(51) Int. Cl.
    *G02B 6/34*        (2006.01)
    *G02B 6/25*        (2006.01)

(52) U.S. Cl.
CPC ... *G02B 6/34* (2013.01); *G02B 6/25* (2013.01)

(58) Field of Classification Search
None
See application file for complete search history.

(56) References Cited

U.S. PATENT DOCUMENTS

| | | | | |
|---|---|---|---|---|
| 5,602,947 A | * | 2/1997 | Neuberger | G02B 6/241 359/622 |
| 6,899,936 B2 | * | 5/2005 | Takemori | B82Y 10/00 216/41 |
| 7,912,334 B2 | * | 3/2011 | Xia | G01K 11/3206 385/12 |
| 8,187,481 B1 | | 5/2012 | Hobbs | |
| 8,189,263 B1 | * | 5/2012 | Wang | G02B 27/0172 359/630 |
| 8,446,675 B1 | * | 5/2013 | Wang | G02B 27/0172 359/630 |
| 8,647,903 B2 | * | 2/2014 | Lee | G03F 7/0005 257/436 |
| 8,828,493 B2 | * | 9/2014 | Cheng | G03F 7/0392 427/258 |
| 2009/0074348 A1 | * | 3/2009 | Xia | G01K 13/00 385/12 |
| 2010/0259823 A1 | * | 10/2010 | Xi | G02B 1/118 359/585 |
| 2010/0313875 A1 | * | 12/2010 | Kennedy | F24J 2/055 126/652 |

OTHER PUBLICATIONS

IEEE online search results re partially-doped gratings.*
Google online search results re partially-doped gratings.*

* cited by examiner

*Primary Examiner* — Andrew Jordan
(74) *Attorney, Agent, or Firm* — Morgan, Lewis & Bockius LLP

(57) ABSTRACT

A system and method for creating a robust anti-reflective surface on a fiber end using various etching techniques to create a shallow grating that creates an effective index of refraction region to transition from air or the input material to the material of the fiber optical cable.

19 Claims, 6 Drawing Sheets

HIGH POWER OPTICAL FIBER ENDS HAVING PARTIALLY-DOPED GRATINGS

COPYRIGHT INFORMATION

A portion of the disclosure of this patent document contains material that is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

The present embodiments relate generally to high power fiber cables and getting high power into those fiber cables.

BACKGROUND OF THE INVENTION

Fiber cables are being developed to deliver multiple kilowatts (kW) of power. Currently, these kW-class optical fiber cables use an anti-reflection (AR) coated quartz (fused silica) block or fiber taper in order to enlarge the optical mode at the fiber cable entrance to reduce the optical power density. A dielectric AR coating is typically deposited at the connector end. The optical mode is enlarged in order to reduce the potential for damage at the AR coating interface. Dielectric AR coatings, whether deposited by e-beam deposition, ion-assisted deposition, or ion-beam sputtering have much lower damage threshold than the bulk fused silica of the fiber itself. What are needed are alternative systems to dielectric coatings that are more robust, and easier to manufacture, which can provide greater than 99% theoretical transmission.

The present systems and methodologies described herein seek to offer such alternative solutions.

SUMMARY OF THE INVENTION

One aspect of the invention provides a method for creating an AR surface on the end of a fiber optical cable. The method includes forming a shallow grating pattern onto the end surface of a fiber optical cable, the pattern obtained by using one of several lithography, etching, or deposition techniques. The number of lines or channels, depth, width and spacing of the grating pattern formed may be in part determined by the desired input wavelength(s).

In another method, the shallow grating pattern is formed on an end cap such as a quartz block or tapered fiber end and then attached to the fiber optical cable using a splicing or other attachment technique known in the art.

Another aspect of the invention provides an AR fiber optical cable end comprising of a plurality of channels having a depth approximately a quarter-wavelength of the desired input wavelength(s).

In some embodiments a grid-pattern, such as square or rectangular grid pattern, may be used. Other patterns include a dotted patterned formed in a hexagonal pattern. In the dotted pattern the channels maybe more akin to divots or holes.

BRIEF DESCRIPTION OF THE DRAWINGS

So that the manner in which the recited features of the invention can be understood in detail, some of the embodiments are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION OF THE PREFERRED EMBODIMENT

Aspects and embodiments relate generally to the field of creating an anti-reflective surface on the end of fiber optical cables. More robust and simpler manufacturing methods are desired.

Embodiments described herein include addressing: 1) creation of an AR surface on the end of a fiber optical cable that is closer to the damage threshold of the optical fiber cable, and 2) creation of a simpler manufacturing process for creating such AR surfaces.

The approaches and embodiments described herein may apply to any type of fiber optical cable and the damage threshold of the AR entrance is close to if not equivalent to the fiber optical material used in the cable.

High power optical fiber cables are important for many applications including laser delivery for industrial materials processing and defense applications. State-of-the-art optical fiber cables for delivery of laser light are commercially available with the capability for multiple kilowatts of output optical power. For example, a 15-micron core diameter passive fiber cable is available from HighYAG with the industrial LLK-D (Automotive) fiber cable interface and is capable of 20 kW of continuous wave (CW) laser output.

Currently available kW-class optical fiber cables often use an anti-reflection (AR) coated quartz block or fiber taper in order to enlarge the optical mode at the fiber cable entrance to reduce the optical power density. In one example of the invention, the coated quartz block is formed from fused silica. A dielectric AR coating is typically deposited at the connector end. The optical mode is enlarged in order to reduce the potential for damage at the AR coating interface. Dielectric AR coatings, whether deposited by e-beam deposition, ion-assisted deposition, or ion-beam sputtering have much lower damage threshold than the bulk fused silica of the fiber itself.

Figure 1:
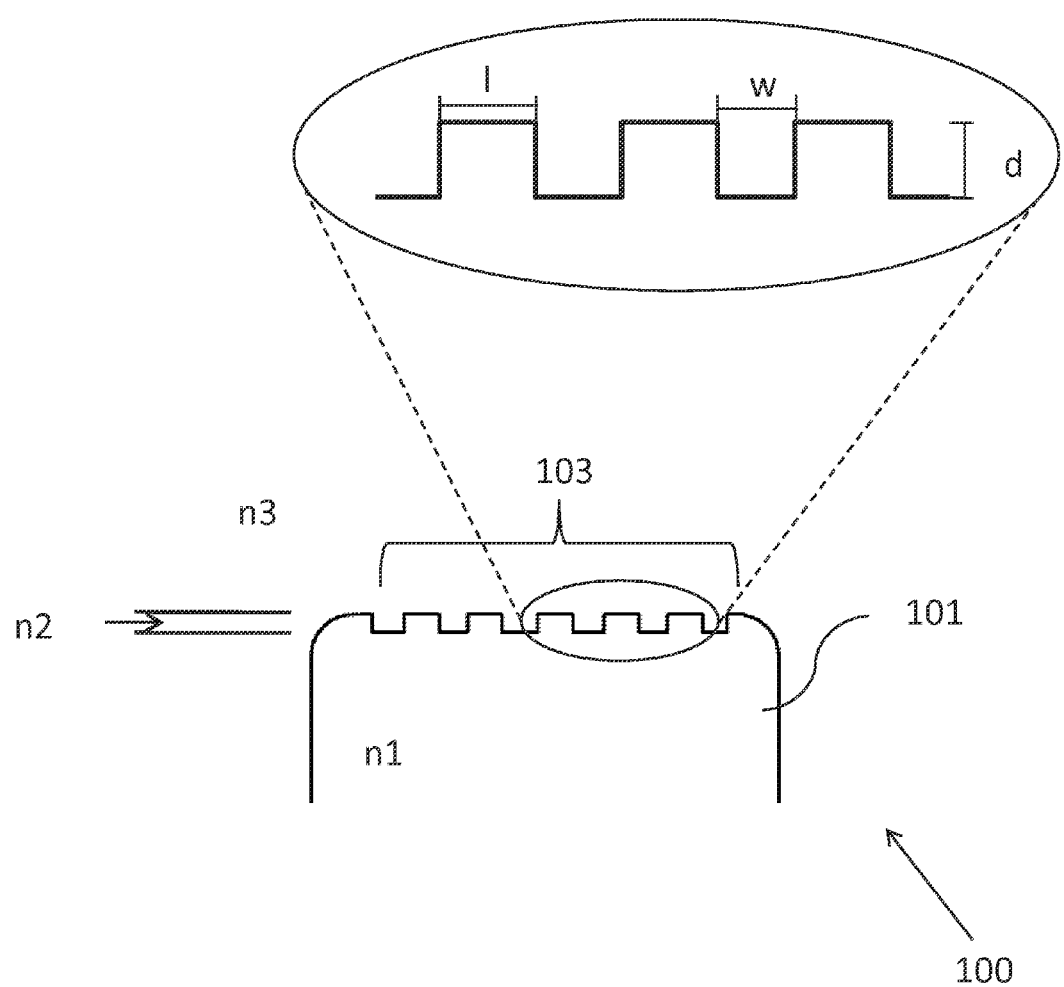
FIG. 1 illustrates a side view of an AR fiber end interface, according to an embodiment of the invention.
Figure 2:
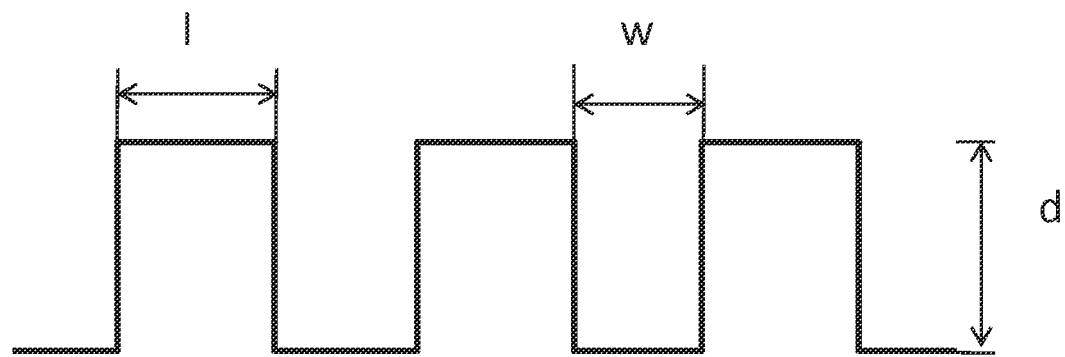
FIG. 2 illustrates a side view of a section of the grating pattern, according to an embodiment of the invention.
Figure 3:
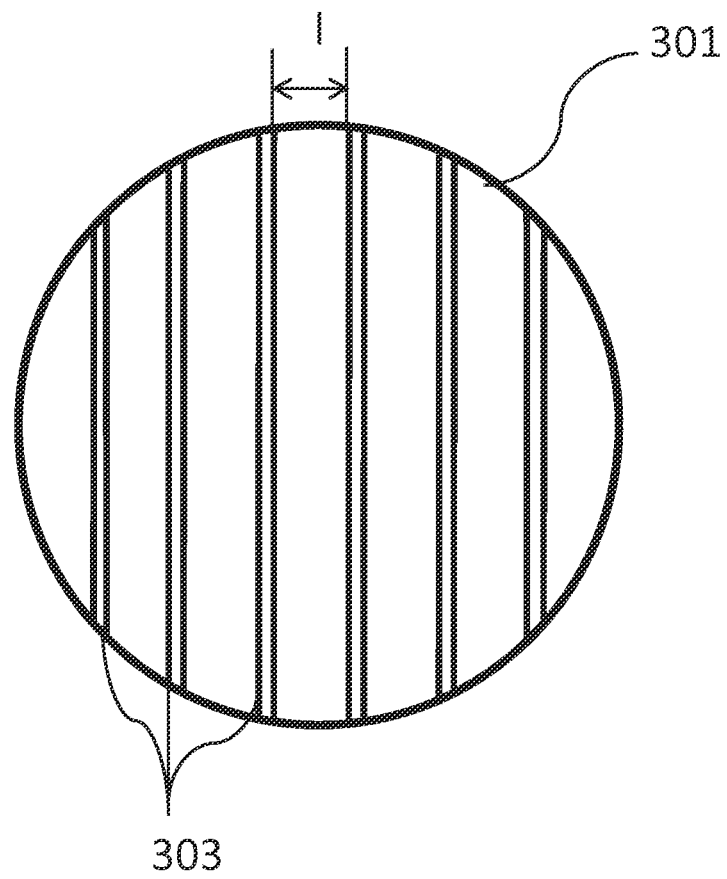
FIG. 3 illustrates a top view of an AR fiber end interface, according to an embodiment of the invention.

The present application describes an anti-reflection (AR) fiber constructed without the use of dielectric coatings. Because there are no dielectric coatings, the AR fiber end is more robust to damage as compared with the AR dielectric coated fiber. In one embodiment, a sub-wavelength, shallow grating is written in the fiber end face as shown in FIG. 1. FIG. 1 illustrates a side view of an AR fiber end interface, according to an embodiment of the invention. The grating 100 has plurality of channels 101 formed on the fiber end face 103 of an optical fibre cable. The channels 101 are formed out of substantially parallel lines obtained by an etching technique applied to the fiber end face 103. The method of obtaining the grating pattern on the optical fiber cable shall be explained in detail later herein. FIG. 2 illustrates a side view of a section of the grating pattern, according to an embodiment of the invention. Each of the channels formed has a depth d. The depth d of the channel 101 etched is dependent on the desired wavelength. The depth d of the channel etches 101 may range from about 20% to about 40% of the desired wavelength input. A period 'l' between the lines may be a repeating distance of about 50 nm to about 1000 nm, which may in part be determined by the desired wavelength(s) input into the fiber optical cable. FIG. 3 illustrates a top view of an AR fiber end interface. The grating 301 formed has a uniform period 'l' between the lines 303.

Figure 4:
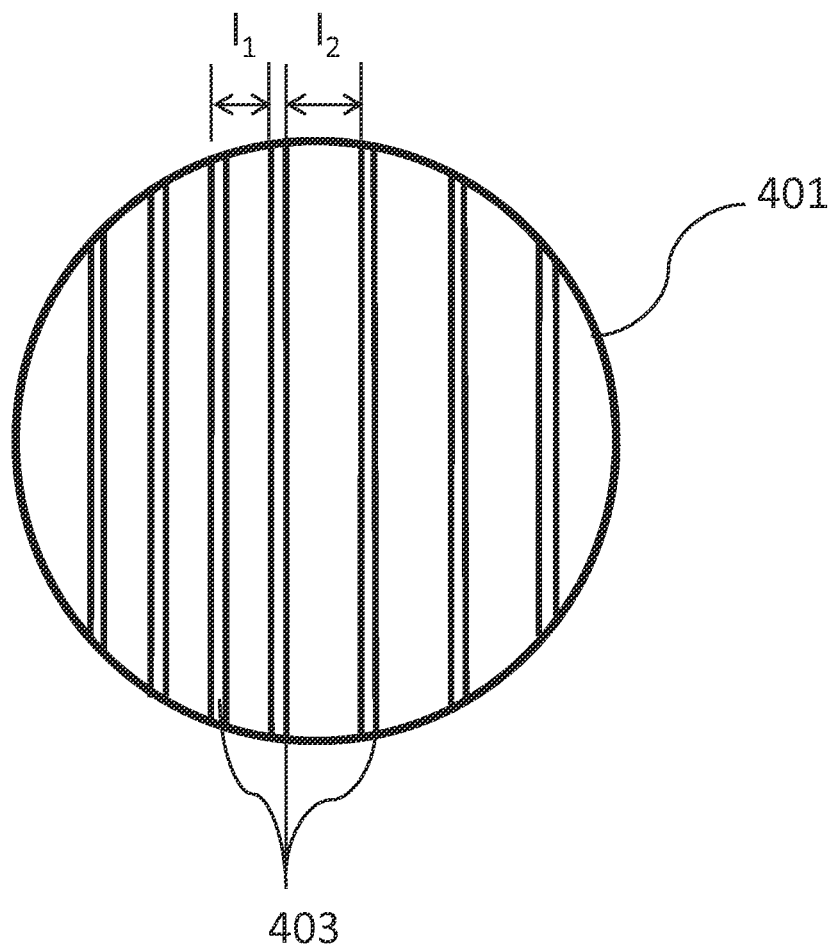
FIG. 4 illustrates a top view of an AR fiber end interface, according to an alternate embodiment of the invention.

Additionally, a non-repeating period may be formed where the distance between each etched or formed line varies. FIG. 4 illustrates a top view of an AR fiber end interface, according to an alternate embodiment of the invention. For example, one part of the surface has etched lines 403, wherein the distance $l_1$ is in a range of about 50 nm to about 100 nm. A second part of the surface has etched lines 403, wherein the distance $l_2$ is in a range of about 200 nm to about 400 nm. The width w of the lines or channels 101 formed is reasonably small compared to the desired wavelength, for example they may range from about 1/10 of a micron to about 1/5 of a micron. These ranges are not meant to be limiting, but by way of example.

For example, for ~1 micron wavelength operation, an AR fiber end can be fabricated with a period of 400 nm and 340 nm etched depth at 25% duty cycle. This pattern is relatively easy to fabricate, and provides >99% theoretical transmission.

The effective index of refraction of the shallow grating layer, $n_2$ in FIG. 1, is determined by the grating period. In some embodiments, the depth of the grating is chosen to be close to a quarter-wavelength. In a simple example, the effective index $n_2=\sqrt{n_1 n_3}$, where $n_1$ is the refractive index of the glass fiber and $n_3$ is the refractive index of the surrounding medium, typically air. More complicated effective index profiles can be constructed by tapering the etch depth to achieve even higher transmission.

The AR fiber end interface as described herein above can be fabricated by optical lithography techniques similar to those employed for producing multi-layer dielectric gratings. In some case e-beam lithography may be used. In one embodiment of the invention, a method for producing an AR end on a fiber cable is provided. The method includes the steps of determining the dimensions of the channels to be formed. The dimension includes but is not limited to the number of channels, depth of channels and spacing of the channels to be formed based on the desired wavelength(s) input. The depth of the channel etches may range from about 20% to about 40% of the desired wavelength input. The period between the lines may be a repeating distance of about 50 nm to about 1000 nm, which may in part be determined by the desired wavelength(s) input into the fiber optical cable. Subsequent to determining the number, depth and spacing of the channels to be formed, the channels are formed through lithography and etching techniques known in the prior art. In one example of the invention, photo resist can be applied to the fiber end face and laser interference lithography can be used to define the grating pattern. Dry etching techniques, such as reactive ion etching (RIE) or ion-beam assisted etching (IBAE) or even wet etching techniques can be used to etch the grating pattern. All such etching techniques capable of forming the said grating pattern and as evident by a person skilled in the art are included within the scope of this invention.

In an alternate embodiment of the invention, the AR end on an optical fiber cable can be obtained through a method that includes determining the number, depth and spacing of the channels to be formed on an end cap. In one example of the invention, the end cap is a quartz block. Furthermore, a quartz block spliced to the fiber end, or tapered fiber end, can alternatively be used. The channels are formed through lithography and etching techniques known in the prior art. The channels formed results in the creation of a grating pattern. The grating can be written in the quartz block or tapered fiber end. These end caps having the grating pattern may also be attached to the ends of a fiber using other techniques known in the art. An advantage of using an end cap to form the shallow grating patterns thereon is the flexibility such a system provides to replace another fiber end while keeping the same fiber optical cable.

The advantages of the AR fiber include improvements in the damage threshold and reliability of high power fiber cables for industrial and defense applications.

Figure 5A:
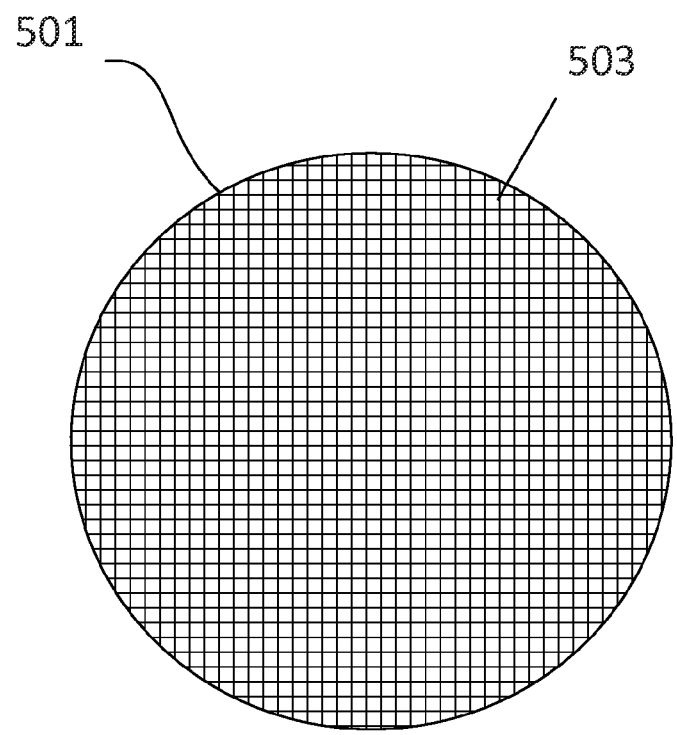
FIGS. 5A-B illustrate additional formed patterns on an end cap.
Figure 5B:
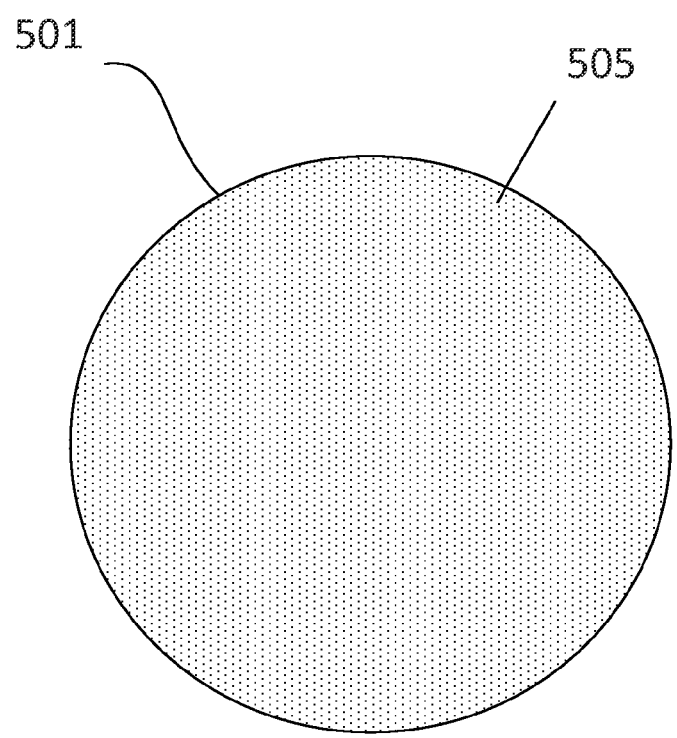

Additional patterns are illustrated in FIGS. 5A-B. Here the patterned surface 501 includes a cross-hatched patterned 503 and dotted-pattern 505. The cross-hatch shown is a square cross-hatch, but rectangular and other cross-hatched patterns are within the scope of this application. The dotted-pattern 505 shown is a symmetrical alternating dotted pattern. Hexagonal patterns, tightly packed dotted-patterns (having bunches or groups of dots dispersed throughout the surface) and other dotted pattern designs are also contemplated and within the scope of this application.

It has been discussed that the gratings and patterns may be formed by etching or other removal processes. Growing or depositing layers to form the gratings is also within the scope of this application. For example, lithographical, chemical and ion deposition techniques known in the art may be implemented to grow the patterned gratings onto the surface of the fiber end cap.

Figure 6A:
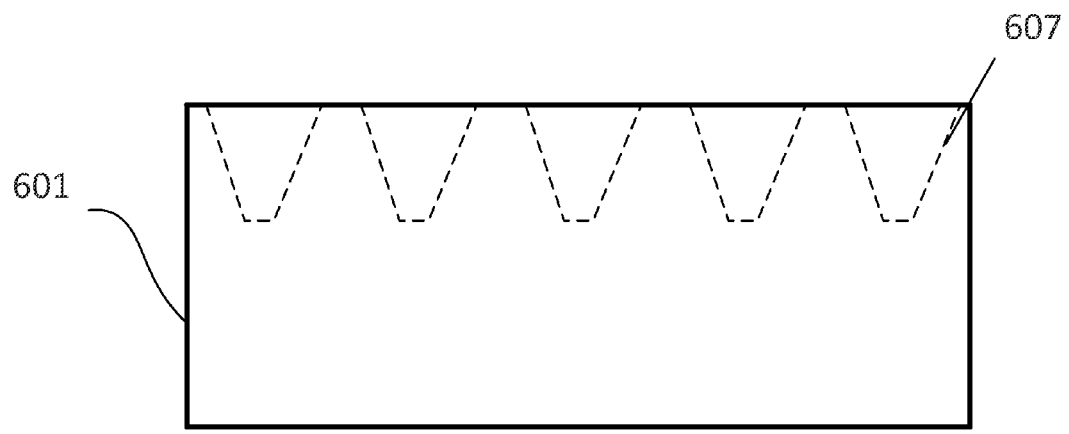
FIGS. 6A-B illustrate etching and deposition techniques including doping a portion of the formed features on the surface of the end cap.

FIG. 6A illustrates a side view of an end cap 601 made of quartz or fused silica having an etched pattern 607 formed therein. Here the sidewalls are angled, to aid in creating a robust surface configured to handle a high-power thermal load while also reducing the anti-reflective (AR) properties of the surface. The patterning (and depending on the depth and spacing and angling) can effectively change the refractive index of the surface to average between the surface medium and the end cap material is described above. As mentioned it should be noted that angling of the channels may impact this transition phase such as the many layers used in MLD coatings without the lower threshold of the MLD coatings.

Figure 6B:
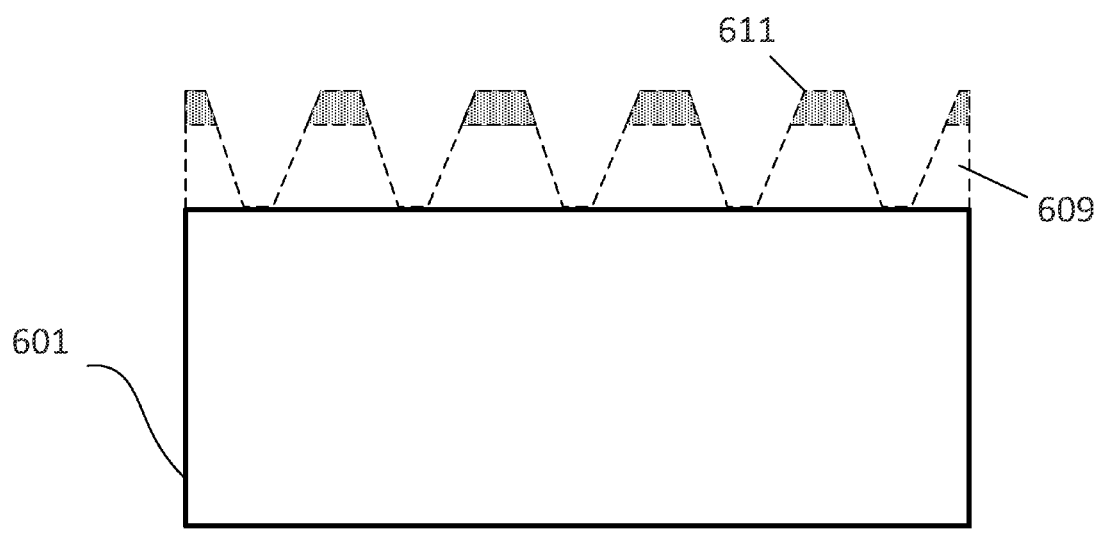

FIG. 6B illustrates a pattern being grown onto end cap 601 where portions of the grown features (pattern) are doped 611 and non-doped 609. For example, fluoride may be doped into a portion of the grown features, which also helps lower the effective index of refraction. In some embodiments at least 10% of the top portion of the features of the pattern are doped. In others 20%, 30%, 40%, 50% or even 60% of the features are doped with a material such fluoride. This doping may occur during the deposition process where fluoride defuses into the features. In other embodiments the pattern surface may be slightly heated in a chamber with fluoride gas that defuses into the top surface and portion of the features. The end cap may also be doped and then etched to form a pattern leaving the top portion of the features of the pattern doped. Other dopants known in the industry may also be used.

In one embodiment, the fluoride doped glass has a refractive index of about 1.35. When formed into a pattern or grating on the surface of an end cap the effective index of refraction reduces to 1.15-1.25. This is helpful when the surrounding medium is air with an approximate index of refraction of about 1.0.

The above description is merely illustrative. Having thus described several aspects of at least one embodiment of this invention including the preferred embodiments, it is to be appreciated that various alterations, modifications, and improvements will readily occur to those skilled in the art. Such alterations, modifications, and improvements are intended to be part of this disclosure, and are intended to be within the spirit and scope of the invention. Accordingly, the foregoing description and drawings are by way of example only.

The invention claimed is:

1. An anti-reflective (AR) optical end cap comprising a shallow anti-reflective uniform grating pattern formed on a portion of an input surface,
   wherein (i) the end cap is formed of a glass material, (ii) the grating has a depth, and (iii) only a top 10%-60% of the depth of the grating is doped.

2. The optical end cap of claim 1, wherein the depth is in a range of about 20% to about 40% of a desired input wavelength.

3. The optical end cap of claim 1, wherein the grating pattern comprises substantially parallel lines etched into the optical end cap.

4. The optical end cap of claim 3, wherein the lines are formed at a repeating distance from each other.

5. The optical end cap of claim 4, wherein the distance between two consecutive parallel lines is in the range of about 50 nm to about 1000 nm.

6. The optical end cap of claim 3, wherein the width of lines ranges from about 1/10 of a micron to about 1/5 of a micron.

7. An anti-reflective (AR) fiber optical cable end comprising a shallow anti-reflective grating pattern,
   wherein (i) the grating has a depth, and (ii) only a top 10%-60% of the depth of the grating is doped.

8. The grating pattern cable end of claim 7, wherein the depth is in a range of about 20% to about 40% of a desired input wavelength.

9. The cable end of claim 8, wherein the variation in the distance between two consecutive parallel lines is in the range of about 50 nm to about 1000 nm.

10. The cable end of claim 8, wherein the variation in the distance is in the range of about 50 nm to about 100 nm over a first region of the grating and in the range of about 200 nm to about 400 nm over a second region of the grating.

11. The cable end of claim 7, wherein the grating pattern comprises substantially parallel lines etched into the fiber optical cable end.

12. The cable end of claim 11, wherein the lines are formed at varying distances from each other.

13. The cable end of claim 11, wherein the width of lines ranges from about 1/10 of a micron to about 1/5 of a micron.

14. A method for producing an anti-reflective (AR) end on an optical fiber cable comprising the steps of:
   determining at least one dimension of a plurality of channels to be formed based on a desired wavelength(s) input;
   forming the channels using one of:
   laser interference lithography, reactive ion etching, wet etching, dry etching, ion deposition, or chemical deposition, wherein the channels form a grating having a depth; and
   doping only a top 10%-60% of the depth of the grating.

15. The method of claim 14, wherein the doping step comprises diffusing a dopant into a percentage of the depth of the channels.

16. The method of claim 14, wherein the dimension is selected from a list consisting of number of channels, depth of channels, angle of channels, and spacing of the channels.

17. A method for producing an anti-reflective (AR) end on a fiber optical cable comprising the steps of:
   determining at least one dimension of a plurality of channels to be formed based on a desired wavelength(s) input;
   forming the channels on an end cap, wherein the channels form a grating having a depth;
   doping only a top 10%-60% of the depth of the grating; and
   attaching the etched end cap to an end of a fiber optical cable.

18. The method of claim 17, wherein the end cap is a quartz block.

19. The method of claim 17, wherein the attaching step is a splicing technique.

* * * * *